US009584428B1

(12) United States Patent
Frink et al.

(10) Patent No.: US 9,584,428 B1
(45) Date of Patent: Feb. 28, 2017

(54) APPARATUS, SYSTEM, AND METHOD FOR INCREASING SCHEDULING EFFICIENCY IN NETWORK DEVICES

(71) Applicant: Juniper Networks, Inc., Sunnyvale, CA (US)

(72) Inventors: Craig R. Frink, Chelmsford, MA (US); Steven Aiken, Pepperell, MA (US); Gerald Lampert, Hopkinton, MA (US); Thomas J. Meyer, Nashua, NH (US); Srihari R. Vegesna, Bangalore (IN); Ajit Jain, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 254 days.

(21) Appl. No.: 14/146,914

(22) Filed: Jan. 3, 2014

(51) Int. Cl.
*H04L 12/811* (2013.01)
*H04L 12/801* (2013.01)
*H04L 12/879* (2013.01)
*H04L 12/861* (2013.01)
*H04L 12/70* (2013.01)
(Continued)

(52) U.S. Cl.
CPC .............. *H04L 47/39* (2013.01); *H04L 49/90* (2013.01); *H04L 49/901* (2013.01); *H04L 47/50* (2013.01); *H04L 49/254* (2013.01); *H04L 49/3072* (2013.01); *H04L 2012/5679* (2013.01)

(58) Field of Classification Search
CPC ......... H04L 47/38; H04L 47/00; H04L 47/10; H04L 47/30; H04L 12/40071; H04L 12/5689; H04L 12/5693; H04L 2012/5679; H04L 2012/5681; H04L 2012/6489; H04L 49/90; H04L 49/9057; H04L 49/9026; H04L 49/9021; H04L 47/6295; H04L 1/1854; H04L 47/50; H04L 49/254; H04L 49/3027; H04L 49/901; H04L 49/00; H04L 49/3045; H04L 49/9042; H04L 47/24; H04L 47/562; H04L 47/11; H04L 47/805; H04L 47/12; H04L 47/621; H04L 45/38; H04L 45/74; H04L 12/56; H04W 72/1278; H04W 72/00; H04W 72/12; H04W 74/00; H04W 74/04; H04W 52/0216
See application file for complete search history.

(56) References Cited

U.S. PATENT DOCUMENTS 7,299,277 B1 * 11/2007 Moran ................ H04L 41/5022
370/230
7,570,654 B2 * 8/2009 Muthukrishnan ... H04L 12/5693
370/428

(Continued)

*Primary Examiner* — Kwang B Yao
*Assistant Examiner* — Ricardo Castaneyra
(74) *Attorney, Agent, or Firm* — FisherBroyles, LLP

(57) ABSTRACT

An apparatus for increasing scheduling efficiency in network devices may include (1) at least one memory device that stores at least one data chunk included in a packet, (2) a scheduler device that (a) schedules transmission of the packet that includes the data chunk and (b) issues a request to transmit the packet based at least in part on the scheduled transmission, and (3) a packet-delivery device that (a) receives the request to transmit the packet from the scheduler device, (b) prepares the packet for transmission at a faster rate than the scheduler device schedules the transmission of the packet, and then (c) facilitates transmitting the data chunk included in the packet to a computing device. Various other apparatuses, systems, and methods are also disclosed.

20 Claims, 5 Drawing Sheets

(51) Int. Cl.
*H04L 12/937* (2013.01)
*H04L 12/863* (2013.01)
*H04L 12/935* (2013.01)

(56) References Cited

U.S. PATENT DOCUMENTS

| | | | |
|---|---|---|---|
| 2002/0067694 A1* | 6/2002 | Cheng | H04L 12/5695 |
| | | | 370/230 |
| 2004/0037281 A1* | 2/2004 | Kim | H04L 49/203 |
| | | | 370/390 |
| 2004/0037302 A1* | 2/2004 | Varma et al. | 370/412 |
| 2007/0115983 A1* | 5/2007 | Yadlon | G06F 9/4843 |
| | | | 370/392 |
| 2008/0151894 A1* | 6/2008 | Maiyuran et al. | 370/392 |
| 2009/0213805 A1* | 8/2009 | Zhang | H04L 5/0046 |
| | | | 370/329 |
| 2010/0158031 A1* | 6/2010 | Thomas | H04L 49/251 |
| | | | 370/412 |
| 2010/0158032 A1* | 6/2010 | Carlsson | 370/412 |
| 2011/0252284 A1* | 10/2011 | Sindhu et al. | 714/722 |
| 2011/0292805 A1* | 12/2011 | Mitsuhashi | H04L 43/0894 |
| | | | 370/237 |
| 2013/0148588 A1* | 6/2013 | Comeau et al. | 370/329 |

* cited by examiner

APPARATUS, SYSTEM, AND METHOD FOR INCREASING SCHEDULING EFFICIENCY IN NETWORK DEVICES

BACKGROUND

Network schedulers are often responsible for managing the sequence of packets transmitted from network devices. In order to manage this sequence of packets, traditional network schedulers may need to perform various scheduling and packet-delivery tasks. For example, a traditional scheduler may make certain scheduling decisions regarding the order of outgoing packets within a transmission queue. In addition to making these scheduling decisions, the traditional scheduler may also control the delivery of data chunks included in the outgoing packets.

Such scheduling and packet-delivery tasks may have different levels of complexity. For example, scheduling tasks may have a higher level of complexity than packet-delivery tasks. As a result, these scheduling tasks may effectively limit the rate at which the traditional scheduler is able to perform the relatively simpler packet-delivery tasks. Unfortunately, this limiting effect may impede the traditional scheduler's overall efficiency and/or performance.

The instant disclosure, therefore, identifies and addresses a need for systems and methods for increasing scheduling efficiency in network devices.

SUMMARY

As will be described in greater detail below, the instant disclosure generally relates to apparatuses, systems, and methods for increasing scheduling efficiency in network devices. In one example, an apparatus for accomplishing such a task may include (1) at least one memory device that stores at least one data chunk included in a packet, (2) a scheduler device that (a) schedules transmission of the packet that includes the data chunk and (b) issues a request to transmit the packet based at least in part on the scheduled transmission, and (3) a packet-delivery device that (a) receives the request to transmit the packet from the scheduler device, (b) prepares the packet for transmission at a faster rate than the scheduler device schedules the transmission of the packet, and then (c) facilitates transmitting the data chunk included in the packet to a computing device.

Similarly, a router incorporating the above-described apparatus may include (1) at least one memory device that stores at least one data chunk included in a packet, (2) a scheduler device that (a) schedules transmission of the packet that includes the data chunk and (b) issues a request to transmit the packet based at least in part on the scheduled transmission, and (3) a packet-delivery device that (a) receives the request to transmit the packet from the scheduler device, (b) prepares the packet for transmission at a faster rate than the scheduler device schedules the transmission of the packet, and then (c) facilitates transmitting the data chunk included in the packet to at least one computing device within a network.

A corresponding method may include (1) receiving a request from a scheduler device to transmit a packet to a computing device, (2) obtaining packet information that identifies at least one data chunk included in the packet, (3) preparing the packet for transmission based at least in part on the packet information at a faster rate than the scheduler device schedules the transmission of the packet, and then (4) transmitting the data chunk included in the packet to the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
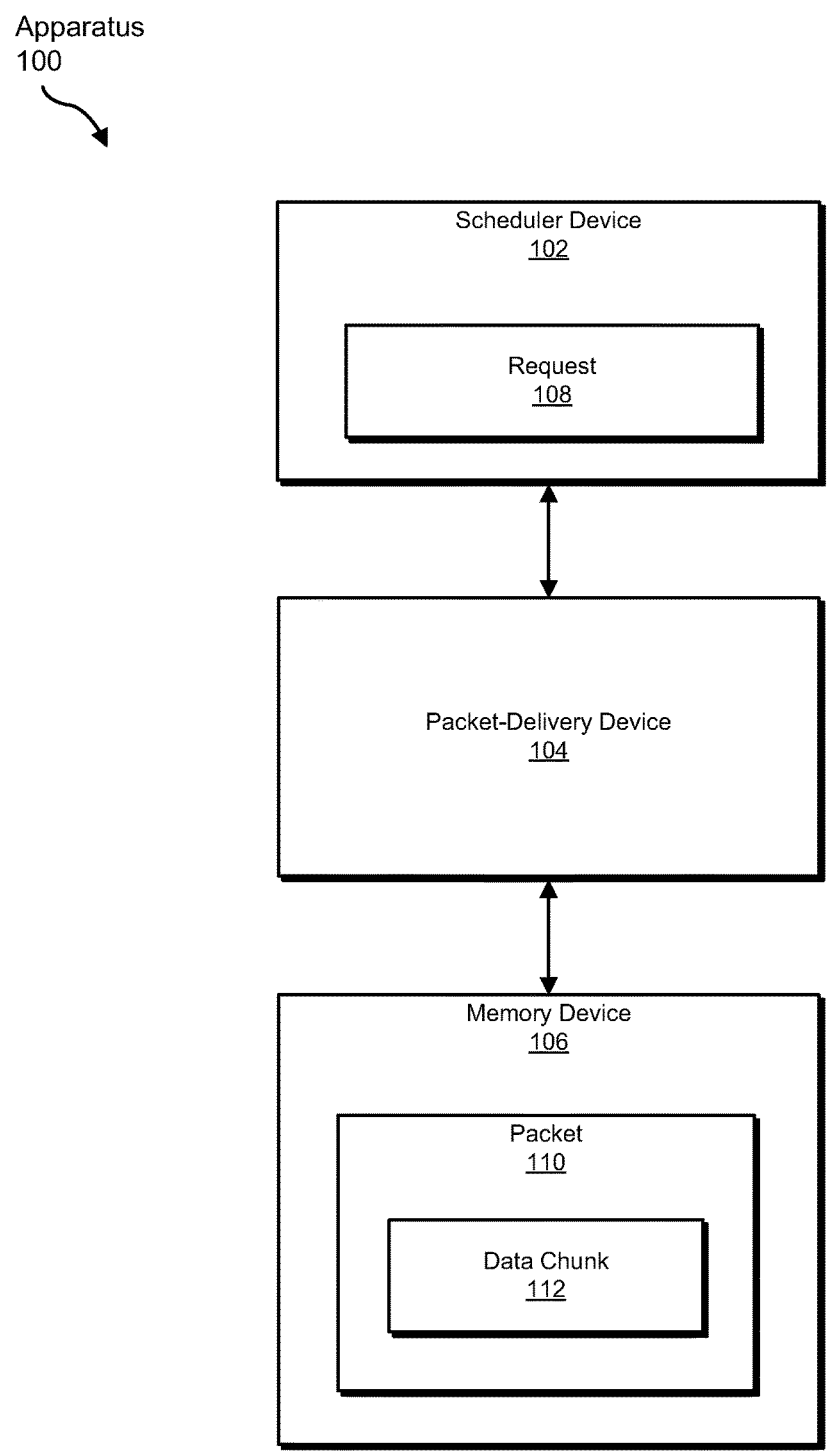
FIG. 1 is a block diagram of an exemplary apparatus for increasing scheduling efficiency in network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for increasing scheduling efficiency in network devices. As will be explained in greater detail below, various embodiments of the instant disclosure may increase scheduling efficiency in network devices by decoupling the scheduling and delivery of network packets. For example, these embodiments may enable a scheduler device to perform complex scheduling tasks and a packet-delivery device to perform relatively simpler packet-delivery tasks. By decoupling the scheduling and delivery of network packets in this way, these embodiments may facilitate performing the complex scheduling tasks at a lower rate and the relatively simpler packet-delivery tasks at a relatively higher rate. In doing so, these embodiments may help increase the scheduling efficiency and/or performance in network devices.

Figure 2:
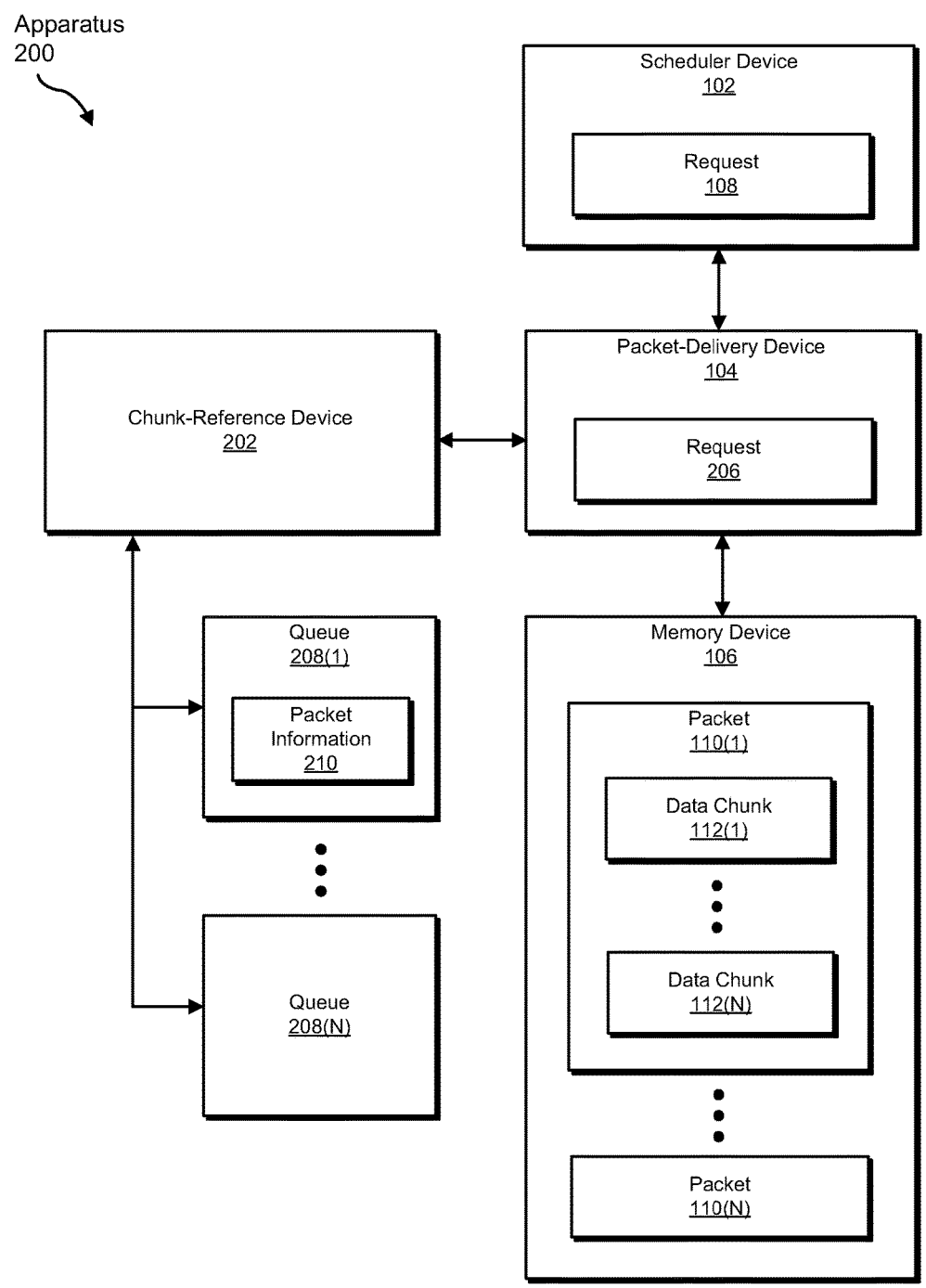
FIG. 2 is a block diagram of an exemplary apparatus for increasing scheduling efficiency in network devices.
Figure 3:
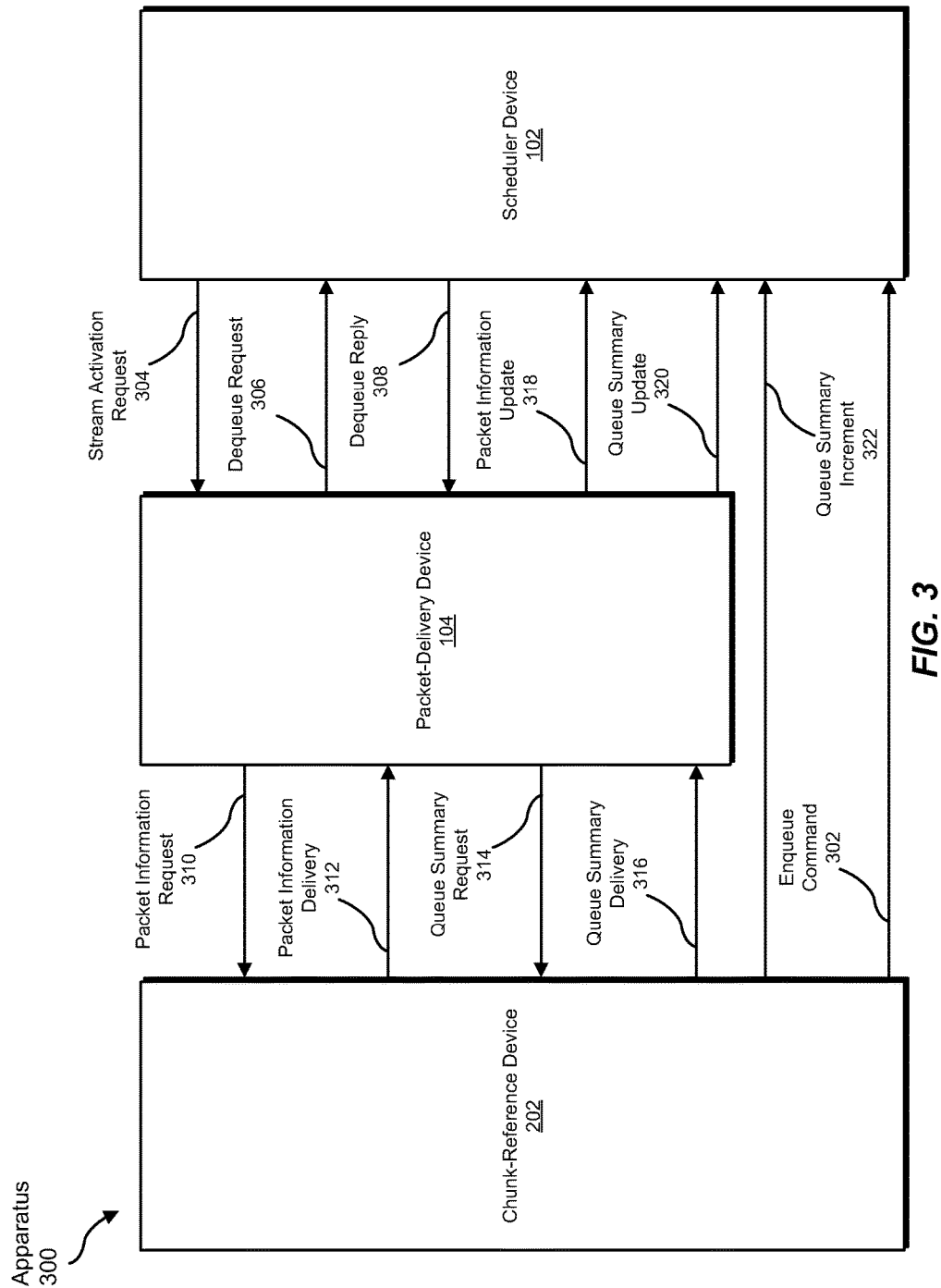
FIG. 3 is a block diagram of an exemplary apparatus for increasing scheduling efficiency in network devices.

The following will provide, with reference to FIGS. 1-3, examples of circuit-based components that may facilitate increasing scheduling efficiency in network devices. The discussion corresponding to FIG. 4 will provide a detailed description of an exemplary method for increasing scheduling efficiency in network devices. Finally, the discussion corresponding to FIG. 5 will provide numerous examples of routers that may include the components and circuits shown in FIGS. 1-4.

FIG. 1 shows a block diagram of an exemplary apparatus 100 for increasing scheduling efficiency in network devices. As illustrated in this figure, apparatus 100 may include a scheduler device 102. The phrase "scheduler device," as used herein, generally refers to any type or form of circuit-based and/or computing component that performs scheduling tasks and/or decisions in a network device. In one embodiment, scheduler device 102 may represent one or more hardware components included in an electrical circuit. Additionally or alternatively, scheduler device 102 may represent a combination of hardware components and software and/or firmware components that work in conjunction with one another to perform scheduling tasks in the network device.

The phrase "scheduling task" and the phrase "scheduling decision," as used herein, generally refer to any type or form of process, procedure, and/or operation that involves scheduling and/or selecting the sequence of packets transmitted from a network device. Examples of such a scheduling task and/or decision include, without limitation, determining at least a portion of the order of outgoing packets within a transmission queue, defining one or more factors that may influence the order of packets within a transmission queue, scheduling transmission of a particular packet, selecting a queue that stores packet information that identifies the contents of a particular packet, issuing a transmission request that specifies a queue that stores packet information for a particular packet, combinations of one or more of the same, or any other suitable scheduling task and/or decision.

Examples of factors that may influence the order of packets within a transmission queue include, without limitation, the priority level of a packet transmission, the bandwidth of a packet transmission, the delay buffer size of a packet transmission, the rate control status of a packet transmission, the drop profile of a packet transmission, combinations of one or more of the same, or any other suitable factors.

The phrase "network device," as used herein, generally refers to any type or form of computing device capable of handling, routing, receiving, transmitting, and/or forwarding packets within a network. Examples of such a network device include, without limitation, routers, switches, network hubs, gateways, network default gateways, nodes, servers, bridges, Field Programmable Gate Arrays (FPGAs), Network Interface Controllers (NICs), network adapters, exemplary computing system 510 in FIG. 5, portions of one or more of the same, combinations of one or more of the same, or any other suitable network device.

FIG. 1 also shows that scheduler device 102 may generate and/or issue a request 108 to transmit a packet from the network device. Request 108 may include any type or form of message, communication, notification, and/or signal that requests and/or initiates transmission of a packet. In one embodiment, request 108 may represent an indication that a particular stream (e.g., a channel and/or a physical port) of the network device is active. Additionally or alternatively, request 108 may represent a reply that initiates transmission of a packet in response to a dequeue request.

As shown in FIG. 1, apparatus 100 may also include a packet-delivery device 104. The phrase "packet-delivery device," as used herein, generally refers to any type or form of circuit-based and/or computing component that performs packet-delivery tasks in a network device. In one embodiment, packet-delivery device 104 may represent one or more hardware components included in an electrical circuit. Additionally or alternatively, packet-delivery device 104 may represent a combination of hardware components and software and/or firmware components that work in conjunction with one another to perform packet-delivery tasks in the network device.

The phrase "packet-delivery task," as used herein, generally refers to any type or form of process, procedure, and/or operation that facilitates transmission and/or delivery of a packet. Examples of such a packet-delivery task include, without limitation, preparing a packet for transmission, identifying the contents of a packet scheduled for transmission, identifying each data chunk included in a packet scheduled for transmission, reconstructing a packet with each corresponding data chunk prior to transmission, facilitating transmission of a packet, transmitting each data chunk included in a packet, directing a memory device to transmit each data chunk included in a packet, combinations of one or more of the same, or any other suitable packet-delivery task.

In some embodiments, packet-delivery device 104 may perform packet-delivery tasks at a faster rate than scheduler device 102 performs scheduling tasks. In one example, packet-delivery device 104 may transmit and/or deliver data chunks at a rate that is approximately twice as fast as the rate at which scheduler device 102 makes scheduling decisions. For example, scheduler device 102 may make approximately 200 million scheduling decisions per second. In contrast, in this example, packet-delivery device 104 may transmit and/or deliver approximately 400 million data chunks per second. Accordingly, packet-delivery device 104 may transmit and/or deliver 2 data chunks for every scheduling decision made by scheduler device 102.

As shown in FIG. 1, apparatus 100 may also include a memory device 106. The phrase "memory device," as used herein, generally refers to any type or form of volatile or non-volatile storage device and/or medium that stores data chunks included in a packet. Examples of memory device 106 include, without limitation, On Chip Memory (OCM), Random Access Memory (RAM), Dynamic Random Access Memory (DRAM), Static Random Access Memory (SRAM), Synchronous Dynamic Random Access Memory (SDRAM), Thyristor Random Access Memory (T-RAM), Twin Transistor Random Access Memory (TTRAM), Zero capacitor Random-Access Memory (Z-RAM), Magnetoresistive Random Access Memory (MRAM), flash memory, memory buffers, combinations of one or more of the same, or any other suitable memory device.

FIG. 1 also shows that memory device 106 may store a packet 110 that includes a data chunk 112. The term "packet," as used herein, generally refers to any type or form of package, encapsulation, abstraction, and/or object that includes one or more data chunks. In one embodiment, packet 110 may represent a portion of encapsulated data included in network traffic that arrived at the network device. Examples of packet 110 include, without limitation, IP version 4 (IPv4) packets, IP version 6 (IPv6) packets, Gateway-to-Gateway Protocol packets, Internet Group Message Protocol (IGMP) packets, Transmission Control Protocol (TCP) packets, combinations of one or more of the same, or any other suitable packet.

The phrase "data chunk," as used herein, generally refers to any type or form of data that represents at least a portion of a packet. In one embodiment, data chunk 112 may represent a portion of data included in packet 110. Additionally or alternatively, data chunk 112 may represent one of several data chunks (not illustrated in FIG. 1) into which packet 110 was divided upon arriving at the network device.

Exemplary apparatus 100 in FIG. 1 may be implemented in a variety of ways. For example, all or a portion of exemplary apparatus 100 may represent portions of exemplary apparatus 200 in FIG. 2. As shown in FIG. 2, apparatus 200 may include scheduler device 102, packet-delivery device 104, and memory device 106.

In addition, apparatus 200 may include a chunk-reference device 202. The phrase "chunk-reference device," as used herein, generally refers to any type or form of circuit-based and/or computing component that maintains, accesses, and/or delivers packet information that identifies the contents of packets in a network device. In one embodiment, chunk-reference device 106 may represent one or more hardware components included in an electrical circuit. Additionally or alternatively, chunk-reference device 202 may represent a combination of hardware components and software and/or firmware components that work in conjunction with one another to maintain packet information in the network device.

As shown in FIG. 2, apparatus 200 may also include queues 208(1)-(N). The term "queue," as used herein, generally refers to any type or form of physical and/or logical storage device and/or medium that stores packet information that identifies the contents of a packet. In one embodiment, queues 208(1)-(N) may each represent a buffer that temporarily stores packet information. Examples of queues 208(1)-(N) include, without limitation, physical and/or logical representations of On Chip Memory (OCM), Random Access Memory (RAM), Dynamic Random Access Memory (DRAM), Static Random Access Memory (SRAM), Synchronous Dynamic Random Access Memory (SDRAM), Thyristor Random Access Memory (T-RAM), Twin Transistor Random Access Memory (TTRAM), Zero capacitor Random-Access Memory (Z-RAM), Magnetoresitive Random Access Memory (MRAM), flash memory, memory buffers, combinations of one or more of the same, or any other suitable queues.

FIG. 2 also shows that queue 208(1) may store packet information 210. The phrase "packet information," as used herein, generally refers to any type or form of data, reference, and/or information that identifies the contents of a packet. Examples of packet information 210 include, without limitation, chunk descriptors that identify addresses of data chunks stored in memory device 106, linked lists of chunk descriptors that collectively identify addresses of data chunks included in packets, end-of-packet identifiers that identify the end of packets and/or data chunks, byte counts that identify the number of bytes included in packets and/or data chunks, combinations of one or more of the same, or any other suitable packet information.

The phrase "chunk descriptor," as used herein, generally refers to any type or form of data, reference, and/or information that identifies the storage location of a particular data chunk. Examples of such a chunk descriptor includes, without limitation, pointers, references, unique identifiers, hashes, fingerprints, checksums, signatures, combinations of one or more of the same, or any other suitable chunk descriptor.

In some embodiments, packet information 210 may include multiple chunk descriptors stored as a single master chunk. The phrase "master chunk," as used herein, generally refers to any collection of chunk descriptors stored in a queue. Each of the chunk descriptors included in the master chunk may correspond to the same queue. Moreover, the master chunk may represent the unit of storage for the queue.

In some embodiments, packet information 210 may include multiple master chunks stored as a linked list. The phrase "linked list," as used herein, generally refers to any type or form of data structure that stores a sequence of data linked together by one or more references. Each of the master chunks included in the linked list may correspond to the same queue.

FIG. 2 also shows that memory device 106 may store packets 110(1)-(N). In one embodiment, packet 110(1) may include data chunks 112(1)-(N). Packet information 210 may identify the contents of packet 110(1). For example, packet information 210 may identify data chunks 112(1)-(N) as being included in packet 110(1). Additionally or alternatively, packet information 210 may include a linked list of chunk descriptors that collectively identify each address of data chunks 112(1)-(N) stored in memory device 106.

In one example, scheduler device 102 may schedule the transmission of packet 110 stored in memory device 106. For example, scheduler device 102 may determine that queue 208(1) currently has the highest priority level among queues 208(1)-(N). In this example, queue 208(1) may be storing packet information 210 that identifies the contents of packet 110(1). In response to determining that queue 208(1) currently has the highest priority level among queues 208(1)-(N), scheduler device 102 may select queue 208(1). By selecting queue 208(1), scheduler device 102 may effectively initiate the process of scheduling the transmission of packet 110(1) since queue 208(1) is storing packet information 210 that corresponds to packet 110(1).

However, when selecting queue 208(1), scheduler device 102 may be unaware that queue 208(1) is storing packet information 210 that corresponds to packet 110(1). In other words, scheduler device 102 may be unaware of the identity of packet 110(1) and/or data chunks 112(1)-(N) being scheduled for transmission. Instead, scheduler device 102 may simply know that queue 208(1) is storing some packet information that corresponds to a packet whose data chunks are stored in memory device 106.

Upon selecting queue 208(1), scheduler device 102 may issue request 108 to transmit the packet whose contents are identified by the packet information stored in queue 208(1). Request 108 may specify the selection of queue 208(1) by a queue number that corresponds to queue 208(1). Scheduler device 102 may then provide request 108 to packet-delivery device 104.

Upon receiving request 108 from scheduler device 102, packet-delivery device 104 may identify the queue number specified in request 108. Packet-delivery device 104 may then determine which packet information to request from chunk-reference device 202 based at least in part on the queue number specified in request 108.

Upon determining which packet information to request, packet-delivery device 104 may issue a request 206 in FIG. 2 to obtain the packet information stored in the selected queue. Request 206 may include any type or form of message, communication, notification, and/or signal that requests and/or initiates retrieval of packet information stored in a queue. Request 108 may also specify the selection of queue 208(1) by a queue number that corresponds to queue 208(1). Packet-delivery device 104 may then provide request 206 to chunk-reference device 202.

Upon receiving request 206 from packet-delivery device 104, chunk-reference device 202 may identify the queue number specified in request 206. In response, chunk-reference device 202 may locate queue 208(1) corresponding to the number specified in request 206 and retrieve packet information 210 from queue 208(1). Chunk-reference device 202 may then provide packet information 210 to packet-delivery device 104.

Upon receiving packet information 210 from chunk-reference device 202, packet-delivery device 104 may prepare packet 110(1) for transmission based at least in part on packet information 210. For example, packet-delivery device 104 may identify multiple chunk descriptors within packet information 210. Each of these chunk descriptors may identify an address of a particular data chunk included in data chunks 112(1)-(N). This address may identify the location where the data chunk is stored in memory device 106.

In some examples, packet-delivery device 104 may expand transmission request 108 to the boundaries of packet 110(1) based at least in part on packet information 210. The phrase "packet boundaries" and the term "boundaries," as used herein, generally refer to the first and last data chunks included in a packet. These first and last data chunks may effectively define the boundaries of the packet. The terms "expand" and "expanding," as used herein with reference to packet boundaries, generally refer to any process, procedure, and/or operation that involves determining which data chunks are included in a packet. By expanding transmission request 108 to the boundaries of packet 110(1), packet-delivery device 104 may be able to identify data chunks 112(1)-(N) as being included in packet 110(1) even though request 108 does not specify data chunk 112(1) and data chunk 112(N) as the boundaries of packet 110(1).

Packet-delivery device 104 may facilitate transmitting each of data chunks 112(1)-(N) included in packet 110(1) in a variety of ways. In one example, packet-delivery device 104 may facilitate transmitting each of data chunks 112(1)-(N) on an individual basis. For example, packet-delivery device 104 may identify a chunk descriptor within packet information 210. This chunk descriptor may identify the address of data chunk 112(1) stored in memory device 106.

Upon identifying this chunk descriptor, packet-delivery device 104 may direct memory device 106 to transmit the data chunk whose address is identified by the chunk descriptor. Since the chunk descriptor identifies the address of data chunk 112(1), memory device 106 may transmit data chunk 112(1) in response to this directive from packet-delivery device 104. Packet-delivery device 104 may continue identifying chunk descriptors and directing memory device 106 to transmit the corresponding data chunks in this way until completing transmission of packet 110(1). This transmission may carry packet 110(1) from the network device to a destination computing device within the network.

Additionally or alternatively, packet-delivery device 104 may reconstruct packet 110(1) with each of data chunks 112(1)-(N) prior to transmission. For example, packet-delivery device 104 may identify each of the chunk descriptors within packet information 112. Packet-delivery device 104 may then retrieve data chunks 112(1)-(N) from memory device 106 based at least in part on the chunk descriptors.

Upon retrieving these chunk descriptors, packet-delivery device 104 may reconstruct packet 110(1) with each of data chunks 112(1)-(N). Packet-delivery device 104 may then transmit packet 110(1). This transmission may carry packet 110(1) from the network device to the destination computing device within the network.

In some examples, packet-delivery device 104 may identify an end-of-packet identifier within packet information 210. This end-of-packet identifier may identify the end of packet 110(1). For example, the end-of-packet identifier may identify data chunk 112(N) as the last data chunk included in packet 110(1). As a result, packet-delivery device 104 may determine the end of packet 110(1) based at least in part on the end-of-packet identifier. In other words, packet-delivery device 104 may know the boundaries of packet 110(1) based at least in part on the end-of-packet identifier.

In some examples, packet-delivery device 104 may stop transmitting data chunks identified by chunk descriptors stored in queue 208(1) upon reaching the end of packet 110(1). For example, queue 208(1) may store one or more chunk descriptors that identify one or more data chunks not included in packet 110(1). Instead, these data chunks may correspond to one or more additional packets. Upon reaching the end of packet 110(1), packet-delivery device 104 may direct memory device 106 to stop the transmission at the end of packet 110(1) so as to prevent transmitting those data chunks not included in packet 110(1).

In some examples, packet-delivery device 104 may facilitate transmitting at least one additional data chunk identified by at least one additional chunk descriptor stored in queue 208(1) despite reaching the end of packet 110(1). For example, queue 208(1) may store one or more chunk descriptors that identify one or more data chunks not included in packet 110(1). Instead, these data chunks may correspond to one or more additional packets. Upon reaching the end of packet 110(1), packet-delivery device 104 may determine that queue 208(1) is not empty. As a result, packet-delivery device 104 may direct memory device 106 to transmit at least one additional data chunk identified by at least one additional chunk descriptor included in queue 208(1) even though scheduler device 102 has not necessarily scheduled transmission of the packet that includes that data chunk.

In some examples, scheduler device 102 may issue multiple requests to transmit packet 110(1) since scheduler device 102 is unaware of the number of data chunks included in packet 110(1). For example, scheduler device 102 may issue a different request 108 for each of data chunks 112(1)-(N) included in packet 110(1). Packet-delivery device 104 may receive each of these transmission requests from scheduler device 102. However, in the event that scheduler device 102 issued a superfluous number of transmission requests, packet-delivery device 104 may refuse to satisfy the superfluous transmission requests.

In one example, packet-delivery device 104 may collapse one or more of these transmission requests on an as-needed basis. The term "collapse," as used herein, generally refers to any type or form of process, procedure, and/or operation that consolidates superfluous transmission requests. For example, packet-delivery device 104 may facilitate transmission of 2 data chunks for every transmission request 108 issued by scheduler device 102. In this example, packet-delivery device 104 may delete one transmission request for every 2-chunk transmission to avoid having any remaining transmission requests after completing the transmission of packet 110(1).

In some examples, scheduler device 102 may refrain from performing additional scheduling tasks when the number of data chunks scheduled for transmission exceeds a predetermined threshold. For example, packet-delivery device 104 may determine that the number of data chunks scheduled for transmission exceeds a predetermined threshold. In response to this determination, packet-delivery device 104 may direct scheduler device 102 to temporarily limit scheduling transmission of additional packets.

As explained above in connection with FIG. 2, by providing scheduler device 102 dedicated to scheduling tasks as well as packet-delivery device 104 and/or chunk-reference device 202 dedicated to facilitating packet-delivery tasks, exemplary apparatus 200 may decouple the scheduling and delivery of network packets. By decoupling the scheduling and delivery of network packets in this way, exemplary apparatus 200 may enable scheduler device 102 to perform the complex scheduling tasks at a lower rate and packet-delivery device 104 and/or chunk-reference device 202 to perform the relatively simpler packet-delivery tasks at a relatively higher rate.

For example, scheduler device 102 may make approximately 200 million scheduling decisions per second. In contrast, in this example, chunk-reference device 202 and/or packet-delivery device 104 may transmit and/or deliver approximately 400 million data chunks per second. Accordingly, chunk-reference device 202 and/or packet-delivery device 104 may transmit and/or deliver 2 data chunks for every scheduling decision made by scheduler device 102. By enabling chunk-reference device 202 and/or packet-delivery device 104 to transmit and/or deliver 2 data chunks for every scheduling decision made by scheduler device 102, exemplary apparatus 200 may help increase the scheduling efficiency and/or performance in the network device.

In some embodiments, portions of exemplary apparatus 100 in FIG. 1 and exemplary apparatus 200 in FIG. 2 may be implemented in other ways. For example, all or a portion of exemplary apparatus 100 and/or all or a portion of exemplary apparatus 200 may represent portions of exemplary apparatus 300 in FIG. 3. As shown in FIG. 3, apparatus 300 may include scheduler device 102, packet-delivery device 104, and chunk-reference device 202.

In one example, a network device that includes apparatus 300 may detect network activity on a particular stream. The term "stream," as used herein, generally refers to any type or form of channel and/or physical port of a network device. As part of this network activity, the network device may receive an incoming packet from a source computing device within a network.

As the network device receives the incoming packet, chunk-reference device 202 may divide the incoming packet into data chunks. For example, chunk-reference device 202 may divide a 1280-byte incoming packet into 10 chunks of 128 bytes. In this example, upon dividing the 1280-byte packet into the 10 data chunks, chunk-reference device 202 may store the 10 data chunks in a memory buffer (not illustrated in FIG. 3).

In one example, chunk-reference device 202 may record all of the addresses at which the 10 data chunks are stored in the memory buffer. Chunk-reference device 202 may also create a linked list of chunk descriptors that collectively identify the addresses of the 10 data chunks stored in the memory buffer. Chunk-reference device 202 may then add this linked list of chunk descriptors to a queue (not illustrated in FIG. 3).

In the event that the queue is empty when the linked list is added, chunk-reference device 202 may initiate an enqueue command 302 that notifies scheduler device 102 that the queue is no longer empty. In response to enqueue command 302, scheduler device 102 may install the queue and/or a corresponding node in a tree data structure whose root node represents the stream. For example, the tree data structure may correspond to the stream that received the incoming 1280-byte packet at the network device. Upon installing the queue and/or corresponding node in the tree data structure, scheduler device 102 may begin to consider the queue when determining which queue to select for transmission.

The term "node," as used herein, generally refers to any type or form of physical and/or logical storage, memory, and/or interface in a network device. Examples of such a node include, without limitation, physical interfaces, streams, physical ports, logical interfaces, Virtual Local Area Networks (VLANs), queues, portions of one or more of the same, combinations of one or more of the same, or any other suitable node in a network device. In one embodiment, the node may represent a hierarchical grouping of queues. Additionally or alternatively, the node may control the bandwidth of the hierarchical grouping of queues.

Scheduler device 102 may determine which queue to select for transmission in a variety of ways. In one example, scheduler device 102 may select a queue based at least in part on the priority level of the queue. For example, scheduler device 102 may apply at least one priority-related algorithm to the queues currently storing chunk descriptors. Scheduler device 102 may then identify and/or select the queue that currently has the highest priority level based at least in part on the priority-related algorithm. Examples of such a priority-related algorithm include, without limitation, Round Robin (RR) scheduling algorithms, Weighted Round Robin (WRR) scheduling algorithms, rate-shaping algorithms, combinations of one or more of the same, or any other suitable priority-related algorithms.

Additionally or alternatively, scheduler device 102 may select a queue based at least in part on the number of chunk descriptors stored in queue. For example, scheduler device 102 may apply a priority-blending technique to the queues storing chunk descriptors. The phrase "priority-blending technique," as used herein, generally refers to any type or form of process, procedure, and/or operation that involves selecting a lower priority queue over a higher priority queue due at least in part to the number of chunk descriptors stored in the lower and higher priority queues. As part of the priority-blending technique, scheduler device 102 may determine that the highest priority queue is currently storing a number of chunk descriptors that fails to meet a predetermined threshold. In response to this determination, scheduler device 102 may identify and/or select a lower priority queue that is currently storing a greater number of chunk descriptors than the highest priority queue.

By selecting the queue, scheduler device 102 may effectively initiate the process of scheduling transmission of a packet whose data chunks are identified by chunk descriptors stored in the queue. For example, scheduler device 102 may select the queue storing the linked list of chunk descriptors that collectively identify the addresses of the 10 data chunks stored in the memory buffer. In doing so, scheduler device 102 may effectively initiate the process of scheduling the transmission of the 1280-byte packet since the selected queue is storing the linked list of chunk descriptors that collectively identify the addresses of the 10 data chunks stored in the memory buffer.

However, when selecting this queue, scheduler device 102 may be unaware that the queue is storing the linked list of chunk descriptors that collectively identify the addresses of the 10 data chunks stored in the memory buffer. In other words, scheduler device 102 may be unaware of the identity of the 1280-byte packet and/or the 10 data chunks being scheduled for transmission. Instead, scheduler device 102 may simply know that this queue is not empty.

Upon selecting this queue, scheduler device 102 may initiate a stream activation request 304 that notifies packet-delivery device 104 that the stream corresponding to the selected queue is active. Packet-delivery device 104 may then know that scheduler device 102 is attempting to schedule the transmission of a packet received on this stream based at least in part on stream activation request 304.

Once packet-delivery device 104 is ready to facilitate transmitting the packet to a destination computing device within the network, packet-delivery device 104 may initiate a dequeue request 306 that notifies scheduler device 102 that packet-delivery device 104 is ready. In response to dequeue request 306, scheduler device 102 may initiate a dequeue reply 308 that notifies packet-delivery device 104 of the queue number that corresponds to the selected queue. Packet-delivery device 104 may then initiate a packet information request 310 to obtain the linked list of chunk descriptors stored in the selected queue from chunk-reference device 202.

In response to packet information request 310, chunk-reference device 202 may locate the selected queue. Chunk-reference device 202 may then retrieve the linked list of chunk descriptors stored in the selected queue. Upon retrieving the linked list of chunk descriptors, chunk-reference device 202 may initiate a packet information delivery 312 to provide the linked list to packet-delivery device 104.

In response to packet information delivery 312, packet-delivery device 104 may prepare the data chunks included in the packet for transmission based at least in part on the linked list. For example, packet-delivery device 104 may expand dequeue reply 308 to the boundaries of the 1280-byte packet based at least in part on the linked list. By expanding dequeue reply 308 to the boundaries of the 1280-byte packet, packet-delivery device 104 may be able to identify the 10 data chunks as being included in the 1280-byte packet even though dequeue reply 308 does not specify the boundaries of the 1280-byte packet.

Packet-delivery device 104 may then facilitate transmitting the data chunks included in the packet to the destination computing device. For example, packet-delivery device 104 may facilitate transmitting each of the 10 data chunks included in the 1280-byte packet to the destination computing device. In this example, packet-delivery device 104 may facilitate transmitting each of the 10 data chunks on an individual basis. Additionally or alternatively, packet-delivery device 104 may reconstruct the 1280-byte packet with the 10 data chunks prior to transmission.

In some example, scheduler device 102, packet delivery device 104, and/or chunk-reference device 202 may maintain a queue summary for each queue. This queue summary may indicate the number of chunk descriptors currently stored in a particular queue. For example, scheduler device 102 may maintain a 5-bit queue summary for a particular queue. In this example, the 5-bit queue summary may indicate whether the queue is currently storing between 0 and 31 chunk descriptors.

Continuing with this example, although the 5-bit queue summary may be unable to specify a number greater than 31, the queue may be able to store more than 31 chunk descriptors. In the event that the queue is currently storing more than 31 chunk descriptors, the 5-bit queue summary may simply indicate that the queue is storing 31 chunk descriptors. In other words, the 5-bit queue summary may indicate that the queue is experiencing a state of saturation. The term "saturation," as used herein, generally refers to a state and/or condition in which a queue is currently storing more chunk descriptors than a corresponding queue summary is able to specify.

In one example, scheduler device 102 may monitor the queue summary of the queue to determining the priority level of the queue. By monitoring the queue summary of the queue, scheduler device 102 may modify the priority level of the queue on an as-needed basis to ensure that the network device is able to achieve maximum performance. In other words, scheduler device 102 may modify the priority level of the queue to ensure that the network device does not experience a dry queue. The phrase "dry queue," as used herein, generally refers to any type or form of attempt to dequeue an empty queue.

In one example, chunk-reference device 202 may initiate a queue summary increment 322 to update the queue summary maintained by scheduler device 102 for a particular queue. Queue summary increment 322 may account for the incoming packet received by the network device. For example, queue summary increment 322 may indicate that chunk-reference device 202 added 10 chunk descriptors to a particular queue. In response to queue summary increment 322, scheduler device 122 may update the queue summary for this queue to account for the 10 chunk descriptors added to the queue.

In one example, packet-delivery device 104 may initiate a queue summary request 314 to obtain the queue summary maintained by chunk-reference device 202 for a particular queue. This queue summary may identify the most up-to-date number of chunk descriptors stored in the queue since chunk-reference device 202 maintains the queue. In response to queue summary request 314, chunk-reference device 122 may identify this queue summary for the queue. Chunk-reference device 122 may then initiate a queue summary delivery 316 to provide this queue summary to packet-delivery device 104.

In one example, packet-delivery device 104 may update the queue summary for a particular queue to account for the data chunks transmitted to a destination computing device within the network. For example, packet-delivery device 104 may facilitate transmitting each of the 10 data chunks included in the 1280-byte packet in response to dequeue reply 308. Upon facilitating this transmission, packet-delivery device 104 may update the queue summary for the queue to account for the 10 data chunks transmitted to the destination computing device.

In one example, packet-delivery device 104 may initiate a queue summary update 320 to update the queue summary maintained by scheduler device 102 for the queue. Scheduler device 102 may then update the queue summary for the queue based at least in part on queue summary update 320. In the event that the updated queue summary indicates that the queue is empty, scheduler device 102 may uninstall the queue from the tree data structure. In the event that the corresponding node does not include any installed queues, scheduler device 102 may also uninstall the node from the tree data structure.

In one example, packet-delivery device 104 may initiate a packet information update 318 to notify scheduler device 102 of the byte count of the packet transmitted to the destination computing device. For example, packet information update 318 may notify scheduler device 102 of the transmission of the 1280-byte packet. Scheduler device 102 may deduct one or more rate-shaping credits from the node based at least in part on packet information update 318. In the event that the node no longer has any positive rate-shaping credits, scheduler device 102 may uninstall the node from the tree data structure.

Figure 4:
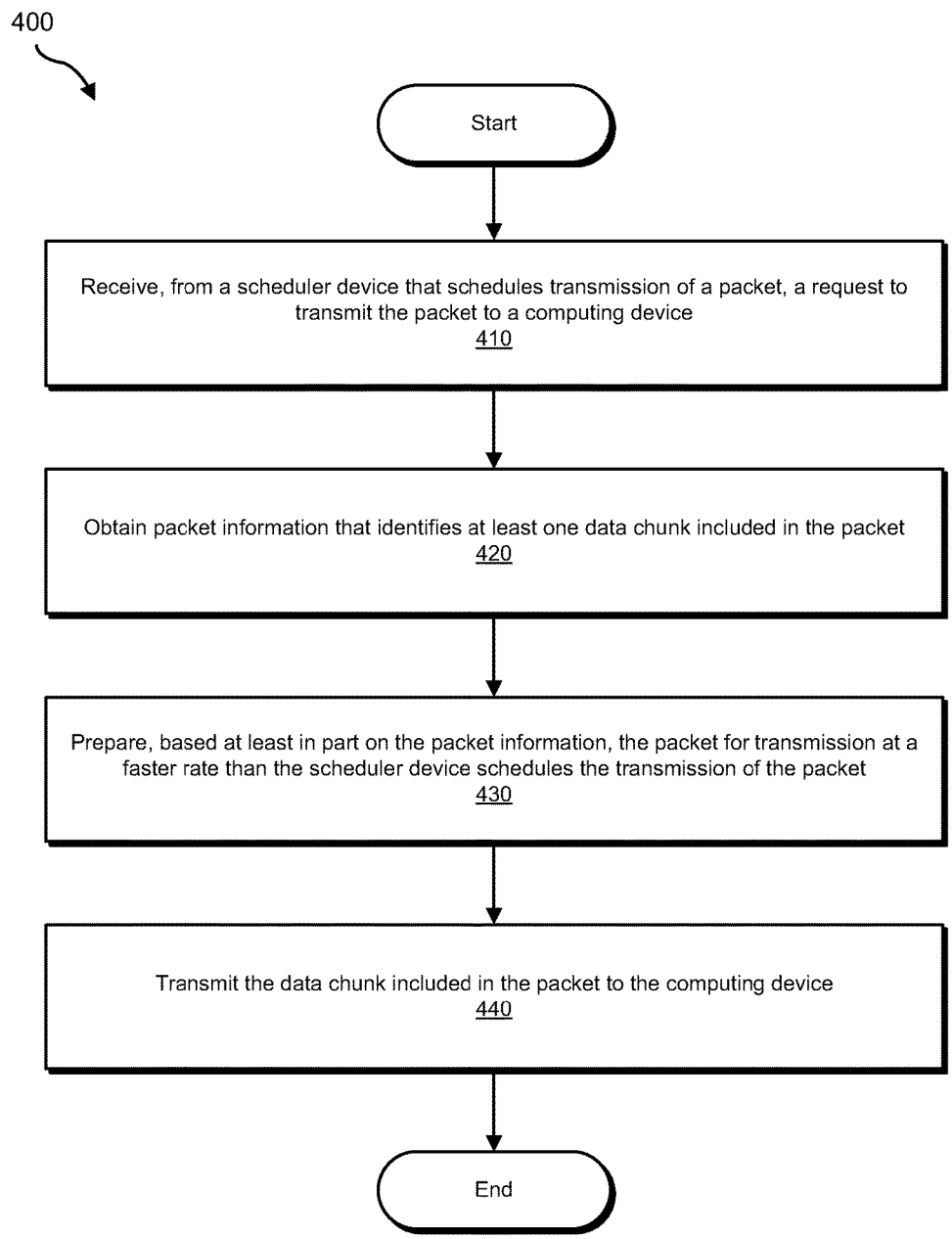
FIG. 4 is a flow diagram of an exemplary method for increasing scheduling efficiency in network devices.

FIG. 4 is a flow diagram of an exemplary method 400 for increasing scheduling efficiency in network devices. Method 400 may include the step of receiving a request from a scheduler device that schedules transmission of a packet (410). The request may initiate transmission of the packet to a computing device. This receiving step may be performed in a variety of ways. In one example, packet-delivery device 104 may receive transmission request 108 from scheduler device 102. In this example, transmission request 108 may initiate transmission of packet 110(1).

Additionally or alternatively, packet-delivery device 104 may receive stream activation request 304 from scheduler device 102. In this example, stream activation request 304 may initiate transmission of packet 110(1).

Additionally or alternatively, packet-delivery device 104 may receive dequeue reply 308 from scheduler device 102. In this example, dequeue reply 308 may initiate transmission of packet 110(1).

Returning to FIG. 4, method 400 may also include the step of obtaining packet information that identifies at least one data chunk included in the packet (420). This obtaining step may be performed in a variety of ways. In one example, packet-delivery device 104 may initiate packet information request 310 to obtain packet information 210 from chunk-reference device 202. In response to packet information request 310, chunk-reference device 104 may initiate packet information delivery 312 to provide packet information 210 to packet-delivery device 104. Packet-delivery device 104 may then obtain packet information 210 in packet information delivery 312.

Returning to FIG. 4, method 400 may also include the step of preparing the packet for transmission based at least in part on the packet information (430). This preparation of the packet may occur at a faster rate than the scheduler device schedules the transmission of the packet. This preparing step may be performed in a variety of ways. In one example, packet-delivery device 104 may expand packet 110(1) to the packet boundaries based at least in part on packet information 210. In doing so, packet-delivery device 104 may be able to identify data chunks 112(1)-(N) as being included in packet 110(1) at a faster rate than scheduler device 102 schedules the transmission of packet 110(1).

Additionally or alternatively, packet-delivery device 104 may retrieve each of data chunks 112(1)-(N) from memory device 106 based at least in part on packet information 210. Packet-delivery device 104 may then reconstruct packet 110(1) with data chunks 112(1)-(N) at a faster rate than scheduler device 102 schedules the transmission of packet 110(1).

Returning to FIG. 4, method 400 may also include the step of transmitting the data chunk included in the packet to the computing device (440). This transmitting step may be performed in a variety of ways. In one example, packet-delivery device 104 may identify a chunk descriptor included in packet information 210. Upon identifying this chunk descriptor, packet-delivery device 104 may direct memory device 106 to transmit the data chunk whose address is identified by the chunk descriptor. Packet-delivery device 104 may then continue identifying chunk descriptors and directing memory device 106 to transmit the corresponding data chunks in this way until completing transmission of each of data chunks 112(1)-(N) included in packet 110(1).

Additionally or alternatively, packet-delivery device 104 may complete reconstructing packet 110(1) with data chunks 112(1)-(N) prior to transmission. Upon completing this reconstruction, packet-delivery device 104 may transmit each of data chunks 112(1)-(N) included in packet 110(1) to the computing device within the network.

Figure 5:
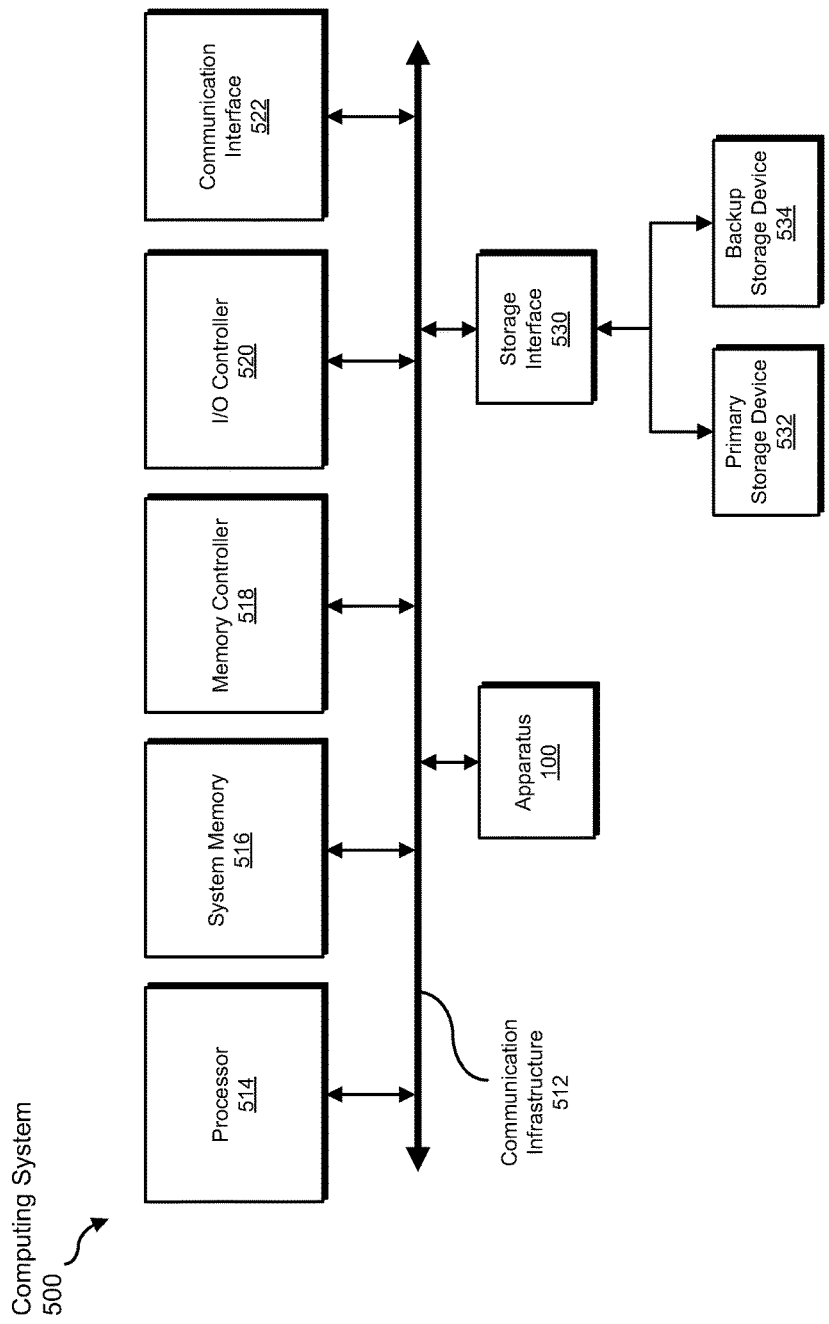
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 4. All or a portion of computing system 500 may also perform and/or be a means for performing and/or implementing any other steps, methods, or processes described and/or illustrated herein. In one example, computing system 500 may include apparatus 100 from FIG. 1. As detailed above, apparatus 100 may help increase scheduling efficiency in computing system 500.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. Processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   at least one memory device that stores a packet that was divided into data chunks upon arriving at a network device;
   a scheduler device that:
      is unaware of the packet's identity and contents;
      schedules transmission of the packet despite being unaware of the packet's identity and contents by selecting a queue that stores packet information that specifies addresses of the data chunks stored in the memory device; and
      issues, based at least in part on the scheduled transmission, a request to transmit the packet that identifies the queue storing the packet information;
   a packet-delivery device that receives, from the scheduler device, the request to transmit the packet; and
   a chunk-reference device that:
      accesses the packet information stored in the queue that is identified in the request to transmit the packet;
      provides the packet information stored in the queue to the packet-delivery device;
   wherein the packet-delivery device:
      prepares, in response to receiving the request, the packet for transmission at a faster rate than the scheduler device schedules the transmission of the packet, wherein preparing the packet for transmission comprises identifying, based at least in part on the addresses specified in the packet information provided by the chunk-reference device, each data chunk that is included in the packet and stored in the memory device; and
      facilitates transmitting the packet to a computing device.

2. The apparatus of claim 1, wherein the packet information comprises at least one of:
   at least one chunk descriptor that identifies at least one address of at least one of the data chunks stored in the memory device;
   a linked list of chunk descriptors that collectively identify each address of each of the data chunks included in the packet;
   an end-of-packet identifier that identifies an end of the packet; and
   a byte count that identifies the number of bytes included in the packet.

3. The apparatus of claim 2, wherein:
   the packet-delivery device further issues, based at least in part on the request to transmit the packet, a request for the packet information that specifies the addresses of the data chunks stored in the memory device; and
   the chunk-reference device further:
      receives, from the packet-delivery device, the request for the packet information that specifies the addresses of the data chunks stored in the memory device; and
      in response to receiving the request for the packet information, provides the packet information to the packet-delivery device.

4. The apparatus of claim 1, wherein the packet-delivery device facilitates transmitting the packet by directing the memory device to transmit each of the data chunks stored at the addresses specified in the packet information to the computing device.

5. The apparatus of claim 1, wherein the scheduler device issues the request to transmit the packet by specifying, within the request, a queue number that corresponds to the queue selected by the scheduler device.

6. The apparatus of claim 5, wherein the packet-delivery device further determines, based at least in part on the queue number specified within the request to transmit the packet, which packet information to request from the chunk-reference device.

7. The apparatus of claim 5, wherein the packet-delivery device further:
   identifies, based at least in part on the packet information, the end of the packet; and
   upon reaching the end of the packet, stops transmitting data chunks whose addresses are specified by chunk descriptors included in the packet information stored in the queue whose queue number is specified within the request.

8. The apparatus of claim 5, wherein the packet-delivery device further:
- identifies, based at least in part on the packet information, the end of the packet; and
- upon reaching the end of the packet, facilitates transmitting at least one additional data chunk identified by at least one additional chunk descriptor stored in the queue whose queue number is specified within the request.

9. The apparatus of claim 1, wherein the scheduler device:
- identifies an additional queue that:
  - has a higher priority level than the queue; and
  - stores at least a portion of additional packet information that specifies addresses of additional data chunks stored in the memory device;
- determines that the number of additional data chunks whose addresses are specified within the additional packet information fails to meet a predetermined threshold; and
- in response to determining that the number of data chunks whose addresses are specified within in the additional packet information fails to meet the predetermined threshold, selects the queue even though the additional queue has the higher priority level.

10. The apparatus of claim 1, wherein:
- the scheduler device issues the request to transmit the packet by issuing a first request and a second request that collectively request transmission of the data chunks included in the packet; and
- the packet-delivery device:
  - receives the request to transmit the packet by receiving the first and second requests that collectively request the transmission of the data chunks included in the packet;
  - in response to the first request, facilitates transmitting the packet by directing the memory device to transmit the data chunks to the computing device; and
  - refuses to satisfy the second request due at least in part to the transmission of the data chunks in response to the first request.

11. The apparatus of claim 10, wherein the packet-delivery device refuses to satisfy the second request by consolidating the first and second requests.

12. The apparatus of claim 1, wherein:
- the scheduler device further makes a plurality of scheduling decisions that involve transmitting a plurality of additional data chunks stored in the memory device to the computing device; and
- the packet-delivery device further facilitates transmitting the plurality of additional data chunks to the computing device at a rate that is twice as fast as the rate at which the scheduler device makes the plurality of scheduling decisions.

13. The apparatus of claim 1, wherein the packet-delivery device further:
- determines that the number of data chunks scheduled for transmission exceeds a predetermined threshold; and
- in response to determining that the number of data chunks scheduled for transmission exceeds the predetermined threshold, directs the scheduler device to at least temporarily limit scheduling transmission of additional packets.

14. The apparatus of claim 1, wherein the packet-delivery device further prepares the packet for transmission by expanding the request to the boundaries of the packet based at least in part on the packet information.

15. A router comprising:
- at least one memory device that stores a packet that was divided into data chunks upon arriving at a network device;
- a scheduler device that:
  - is unaware of the packet's identity and contents;
  - schedules transmission of the packet despite being unaware of the packet's identity and contents by selecting a queue that stores packet information that specifies addresses of the data chunks stored in the memory device; and
  - issues, based at least in part on the scheduled transmission, a request to transmit the packet that identifies the queue storing the packet information;
- a packet-delivery device that receives, from the scheduler device, the request to transmit the packet; and
- a chunk-reference device that:
  - accesses the packet information stored in the queue that is identified in the request to transmit the packet;
  - provides the packet information stored in the queue to the packet-delivery device;
- wherein the packet-delivery device:
  - prepares, in response to receiving the request, the packet for transmission at a faster rate than the scheduler device schedules the transmission of the packet, wherein preparing the packet for transmission comprises identifying, based at least in part on the addresses specified in the packet information provided by the chunk-reference device, each data chunk that is included in the packet and stored in the memory device; and
  - facilitates transmitting the packet to a computing device within a network.

16. The router of claim 15, wherein the packet-delivery device facilitates transmitting the packet by directing the memory device to transmit each of the data chunks stored at the addresses specified in the packet information to the computing device.

17. The router of claim 15, wherein the scheduler device issues the request to transmit the packet by specifying, within the request, a queue number that corresponds to the queue selected by the scheduler device.

18. The router of claim 17, wherein the packet-delivery device further determines, based at least in part on the queue number specified within the request to transmit the packet, which packet information to request from the chunk-reference device.

19. The router of claim 15, wherein the packet-delivery device further:
- identifies, based at least in part on the packet information, the end of the packet; and
- upon reaching the end of the packet, stops transmitting data chunks whose addresses are specified by chunk descriptors included in the packet information stored in the queue whose queue number is specified within the request.

20. A method comprising:
- receiving, from a scheduler device that schedules transmission of a packet that was divided into data chunks and stored in a memory device upon arriving at a network device, a request to transmit the packet to a computing device even though the scheduler device is unaware of the packet's identity and contents;
- in response to receiving the request to transmit the packet:
  - identifying, within the request to transmit the packet, a queue number that specifies a queue that is selected by the scheduler device and stores packet information that includes addresses of the data chunks stored in the memory device;

providing the queue number identified in the request to transmit the packet to a chunk-reference device to enable the chunk-reference device to identify the queue selected by the scheduler device and retrieve the packet information from the queue;

obtaining, from the chunk-reference device, the packet information stored in the queue;

preparing, based at least in part on the packet information, the packet for transmission at a faster rate than the scheduler device schedules the transmission of the packet, wherein preparing the packet for transmission comprises identifying, based at least in part on the addresses included in the packet information, each data chunk that is included in the packet and stored in the memory device; and transmitting the packet to the computing device.

\* \* \* \* \*